United States Patent [19]

Koyama

[11] Patent Number: 4,602,347

[45] Date of Patent: Jul. 22, 1986

[54] MICROCOMPUTER ADDRESSING SYSTEM AND ELECTRONIC TIMEPIECE UTILIZING THE SAME

[75] Inventor: Hiroshi Koyama, Gunma, Japan

[73] Assignees: Sanyo Electric Co., Ltd.; Tokyo Sanyo Electric Co., Ltd., both of Japan

[21] Appl. No.: 410,126

[22] Filed: Aug. 20, 1982

[30] Foreign Application Priority Data

Aug. 31, 1981 [JP] Japan .................... 56-137181

[51] Int. Cl.[4] .................... G06F 7/48
[52] U.S. Cl. .................... 364/569; 364/200; 364/705; 364/900; 365/231
[58] Field of Search .................... 364/486, 569, 701, 200, 364/900, 705; 377/20; 368/155, 156, 62, 73; 365/189, 230, 231

[56] References Cited

U.S. PATENT DOCUMENTS

| | | | |
|---|---|---|---|
| 4,200,919 | 4/1980 | Page et al. | 365/230 |
| 4,227,247 | 10/1980 | Kintner | 364/147 X |
| 4,238,832 | 12/1980 | Tsuzuki et al. | 364/705 |
| 4,245,323 | 1/1981 | Yamazaki et al. | 364/705 |
| 4,330,840 | 5/1982 | Kobayashi | 364/705 |
| 4,348,743 | 9/1982 | Dozier | 364/569 X |
| 4,408,305 | 10/1983 | Kuo | 365/230 X |
| 4,415,994 | 11/1983 | Ive et al. | 365/230 X |
| 4,475,176 | 10/1984 | Ishii | 365/230 X |
| 4,486,847 | 12/1984 | Wattenhofer | 364/705 |

OTHER PUBLICATIONS

"MCS-48 Family of Single Chip Microcomputers User's Manual"; Intel; Sep. 1980.

*Primary Examiner*—Parshotam S. Lall
*Assistant Examiner*—Kevin J. Teska
*Attorney, Agent, or Firm*—Darby & Darby

[57] ABSTRACT

A microcomputer comprises an address decoder (23) for providing address signals to a random access memory (21). The address decoder (23) is adapted to generate a plurality of address signals in accordance with one piece of instruction data obtained from an instruction register (10). On the other hand, a control circuit (11) is provided for generating change signals in response to the instruction data for controlling a T type flip-flop (24, 25 or 26). The address decoder is responsive to the signal from the T type flip-flop to select and provide one of the plurality of address signals. Accordingly, a plurality of addresses are designated in accordance with one piece of the instruction data, whereby one of them is selected by a change signal. Thus, a program for addressing a random access memory can be simplified. The microcomputer is advantageously employed in an electronic timepiece employing a microcomputer by adapting such that a plurality of pieces of alarm timing data are subjected to the same processing of detection of coincidence with the current time.

4 Claims, 5 Drawing Figures

MICROCOMPUTER ADDRESSING SYSTEM AND ELECTRONIC TIMEPIECE UTILIZING THE SAME

BACKGROUND OF THE INVENTION

1. Field of the Invention

The present invention relates to a microcomputer and an electronic timepiece utilizing a microcomputer. More specifically, the present invention relates to a microcomputer employing an improved addressing system of a random access memory and an electronic timepiece utilizing such a microcomputer.

2. Description of the Prior Art

A conventional electronic timepiece employs frequency division utilizing counters. However, such conventional electronic timepiece involves an inconvenience in which the electronic circuit need be redesigned from the beginning in making modifications of the particulars of a timepiece circuit. In order to eliminate such inconvenience, an electronic timepiece utilizing a microcomputer has also been proposed and put into practical use. Such electronic timepiece utilizing a microcomputer is referred to as a microcomputer type timepiece in the present application for simplicity of description. Generally, a microcomputer type timepiece has an advantage that modifications of the particulars can be made by simply changing masks for use in fabricating a read only memory for storing a program.

Figure 1:
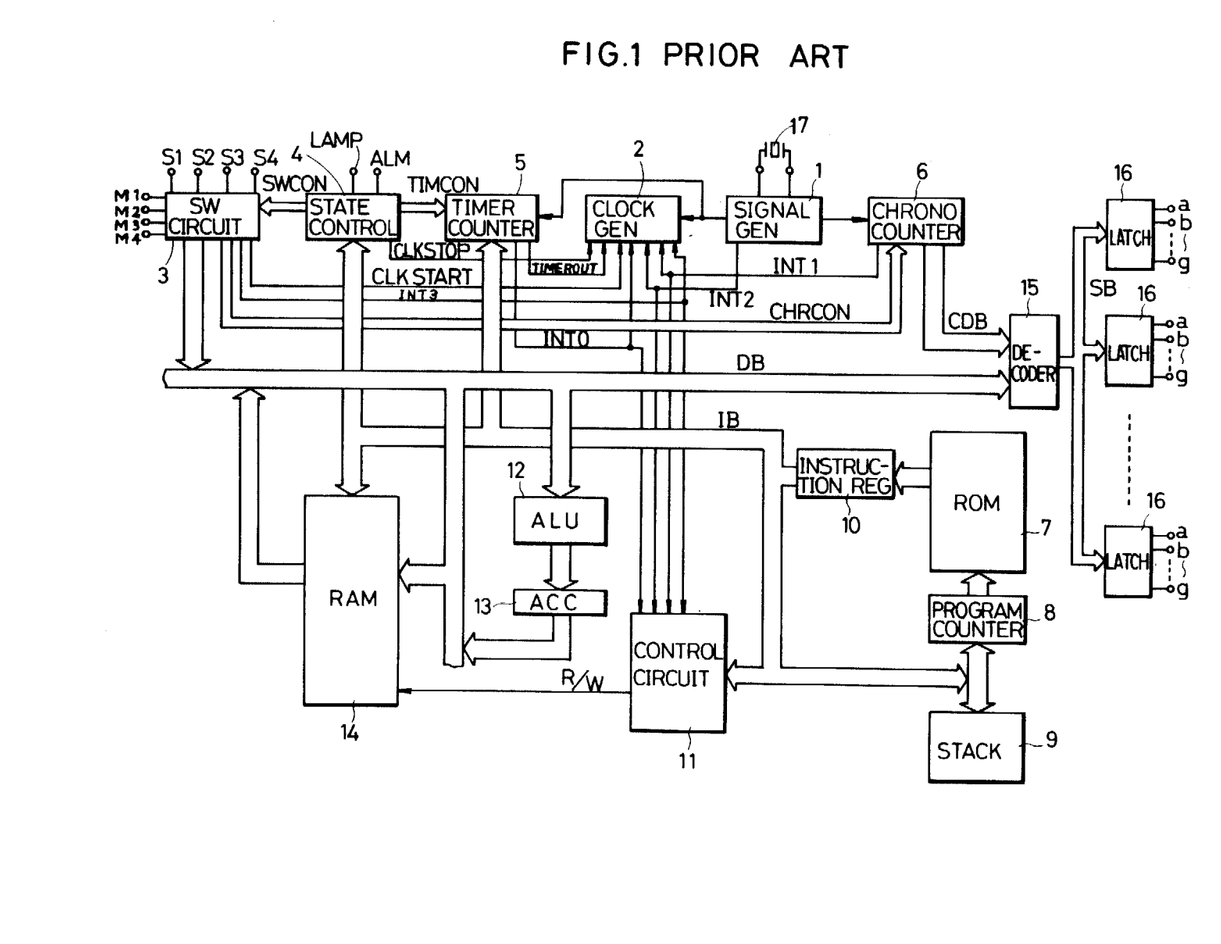
FIG. 1 is a block diagram of an electronic timepiece employing a microcomputer.

FIG. 1 is a block diagram of a conventional microcomputer type timepiece. The timepiece shown comprises a reference signal generating circuit 1, a clock generator 2, a switch input circuit 3, a state control circuit 4, a timer counter 5, a chronograph counter 6, a read only memory 7, a program counter 8, a stack 9, an instruction register 10, a control circuit 11, an arithmetic logic unit 12, an accumulator 13, a random access memory 14, a decoder 15, and a latch circuit 16.

The reference signal generating circuit 1 is connected to a quartz resonator 17 and makes oscillation to provide an oscillating signal the frequency of which is determined by the quartz resonator 17. The oscillating signal is frequency divided and a predetermined frequency divided signal is applied to the clock generator 2, the switch input circuit 3, the timer counter 5, the chronograph counter 6 and the like. The reference frequency generating circuit 1 is also adapted to provide an interrupt signal INT2 for the purpose of causing a time count operation at each predetermined period of time, say for every 0.5 second.

The clock generator 2 generates a system clock signal for performing an operation as a central processing unit by the use of a frequency divided signal obtained from the reference frequency generating circuit 1 and the system clock signal is applied to various portions of the circuit. The clock generator 2 is supplied with a stop signal CLKSTOP for stopping generation of the clock signal from the state control circuit 4, so that the clock generator 2 is responsive to the stop signal CLKSTOP to stop the operation. The clock generator 2 is also connected to receive from the reference signal generating circuit 1, the chronograph counter 6 and the like the interrupt signals INT0, INT1, INT2 and INT3 and the timer output TIMEROUT and to receive an operation start signal CLKSTART, so that the clock generator is responsive to these signals to restart the operation which has been stopped.

The switch input circuit 3 comprises external terminals M1 to M4 and S1 to S4 for preventing a chattering phenomenon of the switches connected thereto and for receiving the on/off data of the switches connected thereto, while the data is transferred to the data bus DB. The on/off control of the switches connected to the external terminals S1 to S4 can be designated by the switch control signal SWCON of the state control circuit 4 and can provide an operation start signal CLKSTART in response to the on/off of the designated switch. Furthermore an interrupt signal INT3 can also be obtained in response to the on/off of the switches connected to the external terminals S1 to S4. In the chronograph mode a chronograph control signal CHRCON for controlling start, lap and stop of the chronograph counter 6 is obtained in response to the on/off of the switches connected to the terminals S1 and S2.

The state control circuit 4 is controlled in accordance with the program obtained over the instruction bus IB so that the states of the various circuits are controlled in various modes and provides the switch control signal SWCON for controlling the switch input circuit 3, the timer control signal TIMCON for performing selection of the reset, start and timer time period of the timer counter 5 and the stop signal CLKSTOP for stopping the operation of the clock generator 2. Furthermore there are provided an external terminal LAMP for connection of a lamp and an external terminal ALM connected to an alarm tone generator.

The timer counter 5 can allow for setting of a timer time period in accordance with the program sent over the instruction bus IB and provides a signal TIMEROUT for starting the operation of the clock generator 2 after the lapse of the timer time period.

The chronograph counter 6 comprises a counter for counting up to 1/100 second and 1/10 second and provides an interrupt signal INT1 at every 1/10 second. The count value in the chronograph counter 6 is applied through the chronograph data bus CDB to the decoder 15.

The read only memory 7 comprises 1390×14 bits and stores in a fixed manner a program for performing a timing operation and various controls. To that end the read only memory 7 provides to the instruction register 10 an instruction code of 14 bits stored in the address designated by the program counter 8 of 11 bits.

The instruction register 10 stores an instruction code obtained from the read only memory 7 and provides the same on the instruction bus IB.

The program counter 8 receives the next address or jump control signal after processing of one instruction to provide to the read only memory 7 an address signal of the address to which jump is to be made.

The stack 9 has the capacity of eight levels and stores the sum of the count value in the program counter 8 plus one in the case where the operation should shift to the interrupt processing or subroutine. However, an interrupt processing is to be made after the instruction "SCP" for stopping the operation of the clock generator 2 is executed, the count value of the program counter 8 is as such stored in the stack 9 and, after the end of the interrupt processing, again the stop instruction "SCP" of the clock is addressed and the same is executed.

The random access memory 14 stores in appropriate regions the data concerning the current time, an alarm time, a timer time period and the like. The addresses of the random access memory 14 are designated by the instructions obtained from the instruction register 10 and the data stored in the designated addresses is sent to the data bus DB in response to the read/write control signal R/W obtained from the control circuit 11 or the data sent to the data bus DB is stored in the designated addresses.

The arithmetic logic unit 12 receives data sent onto the data bus DB and makes an arithmetic operation such as addition, subtraction and the like and the result is stored in the accumulator 13 and is sent again onto the data bus DB.

The decoder 15 and the latch circuit 16 constitute a display circuit. The decoder 15 converts the applied data of four bits to seven segment signals for display and provides the same to the segment bus SB. The latch circuit 16 holds the segment signals sent to the segment bus SB and provides the same to the external terminals a to g and to that end the external terminals of the number corresponding to that of the segments are provided. Which latch circuit should store the converted segment signals is determined in accordance with the program and, in the case where the data of the first digit of the current time is converted, for example, the latch circuit 16 corresponding to the display unit for displaying the first digit of the current time is designated by the program. On the other hand, the decoder 15 is also connected to the chronograph data bus CDB for supply of the output from the chronograph counter 6 as well as the data bus DB and the decoder 15 is selectively connected to either the data bus DB or the chronograph data bus in accordance with the program.

The control circuit 11 deciphers the instructions of the read only memory 7 sent over the instruction bus IB and controls the respective circuits as a function of the system clock obtained from the clock generator 2 for the purpose of performing the operation corresponding to the instructions. Furthermore, the program counter 8 and the read only memory 7 are controlled to execute the processing corresponding to the interrupt when the interrupt signals INT0, INT1, INT2 and INT3 are provided.

Now a principal operation of the FIG. 1 timepiece will be described. When a power supply is turned on, an initial clear is rendered effective and the respective circuits are reset, while the program counter 8 designates the address zero of the read only memory 7. The address zero of the read only memory 7 stores the program for initial setting and therefore "0" or predetermined data is stored in the random access memory 14 through execution of the program, whereby initial setting is performed. Then the program of mode change is executed. This program serves to determine which mode, the current time mode, the alarm mode, the timer mode or the chronograph mode, or if another function has been employed, an additional mode, has been selected in accordance with the contents of the data representing the on/off of the switch applied to the data bus DB from the switch input circuit 3.

In the case where the current time mode is selected, for example, the current time is displayed. More specifically, the minute digit, the ten-minute digit, the hour digit, and the ten-hour digit stored in the predetermined address of the random access memory 14 are in succession addressed in accordance with the display instructions of the addressable random access memory 14 and the data is sent to the data bus DB. The segment signals as converted by the decoder 15 are stored in the latch circuit 16. The decoder 15 is in advance controlled by the instructions so that the data bus DB may be connected to the decoder 15. The latch circuit 16 serves to keep providing the stored segment signals to the external terminals a to g until the new segment data is renewed.

Then a coincidence detection program for detecting coincidence of the data concerning the current time stored in the predetermined address of the random access memory 14 and the data concerning the alarm time is executed in the case where the alarm mode is selected, for example. Coincidence detection is performed in succession for the ten-hour digit, the hour digit, the ten-minute digit and the minute digit and, upon detection of coincidence in all digits, the alarm signal is obtained at the output terminal ALM of the state control circuit 4.

Meanwhile, some type of electronic timepiece is adapted to have a so-called multialarm function. By multialarm function is meant a function capable of setting a plurality of alarm times per day. For example, a plurality of alarm times such as in the morning, day and evening may be set with such electronic timepiece and thus a multialarm function is of much convenience.

A typical conventional microcomputer type timepiece having a multialarm function is adapted such that a plurality of alarm times are stored in different addresses of the random access memory and coincidence of the same with the current time is detected for each of the stored data. Accordingly, a coincidence detection program for detecting coincidence of the current time and the alarm times requires two or more programs of different addressing data, with the resultant disadvantage that the program becomes complicated and lengthy. However, coincidence detection of the current time with alarm times is common to any of the alarm times. Therefore, if an addressing scheme for different alarm times could be simplified, the coincidence detection program could be accordingly simplified.

SUMMARY OF THE INVENTION

Briefly described, the present invention comprises a microcomputer, including; instruction data generating means for generating instruction data for designating various kinds of operations, change signal generating means responsive to the instruction data for generating change signals for controlling, logical state storing means responsive to the change signals for storing a first or second logical state, storage means including a number of one-bit memory cells wherein a plurality of memory cells out of said number of memory cells are designated as a set in response to the address signal for designating an address, and an address decoder means responsive to one piece of the instruction data for generating a plurality of the address signals and responsive to the signal from the logical state storing means for selecting a state in which one of the plurality of address signals is obtained.

A preferred application of the microcomputer comprises an electronic timepiece which further comprises reference signal generating means for generating a reference signal having predetermined time intervals, clock generator means for generating various kinds of clock signals as a function of the reference signal, data bus means for transferring the data to and from the storing means, arithmetic logic unit means for performing arithmetic operation of the data from the data bus, switch signal generating means for providing switch signals to the data bus at a predetermined timing, state control means for controlling the states of the respective portions in various modes, and display means for displaying the data from the data bus.

According to the inventive microcomputer, the instruction data from the instruction data generating means is applied to the address decoder and the change signal generating means. The address decoder is responsive to one piece of instruction data to generate a plurality of address signals. A plurality of memory cells out of a multiplicity of memory cells in the storing means are designated as a set in response to one of the address signals. On the other hand, the change signal generating means is responsive to the instruction data to generate a change signal and the logical state storing means is responsive to the change signal to store the first or second logical state. The address decoder selects one of the plurality of address signals as a function of the signal from the logical state storing means to provide the same. Accordingly, a plurality of sets of memory cells are designated as a function of the one piece of instruction data, whereupon one set is selected as a function of the change signal. Accordingly, a microcomputer is provided in which a program can be simplified.

According to an electronic timepiece employing the inventive microcomputer, alarm timing data of a plurality of kinds, say two kinds, is stored in a plurality of sets of memory cells having the same addresses in the storing means. Then detection of coincidence of the first alarm timing data and the current time data is executed in accordance with a subroutine. Then the second alarm timing data is read out as a function of the change signal and detection of coincidence of the second alarm timing data with the current time data is executed in accordance with the subroutine. Accordingly, a program can be implemented as a subroutine and hence can be simplified in an electronic timepiece employing the inventive microcomputer.

Accordingly, a principal object of the present invention is to provide a microcomputer wherein a program for addressing a random access memory can be simplified and an electronic timepiece employing such microcomputer.

An aspect of the present invention resides in simplification of a program for addressing a random access memory in a microcomputer.

Another aspect of the present invention resides in simplification of a program for achieving processing of the program as a subroutine in applying the same processing with respect to different pieces of data in a microcomputer.

A further aspect of the present invention resides in an increase of a capacity of a random access memory in a microcomputer without increasing the number of bits of instruction data.

The present invention can be widely utilized in applying the same processing with respect to different data, such as applying multialarm processing in an electronic timepiece, addition processing of dual time, and the like.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
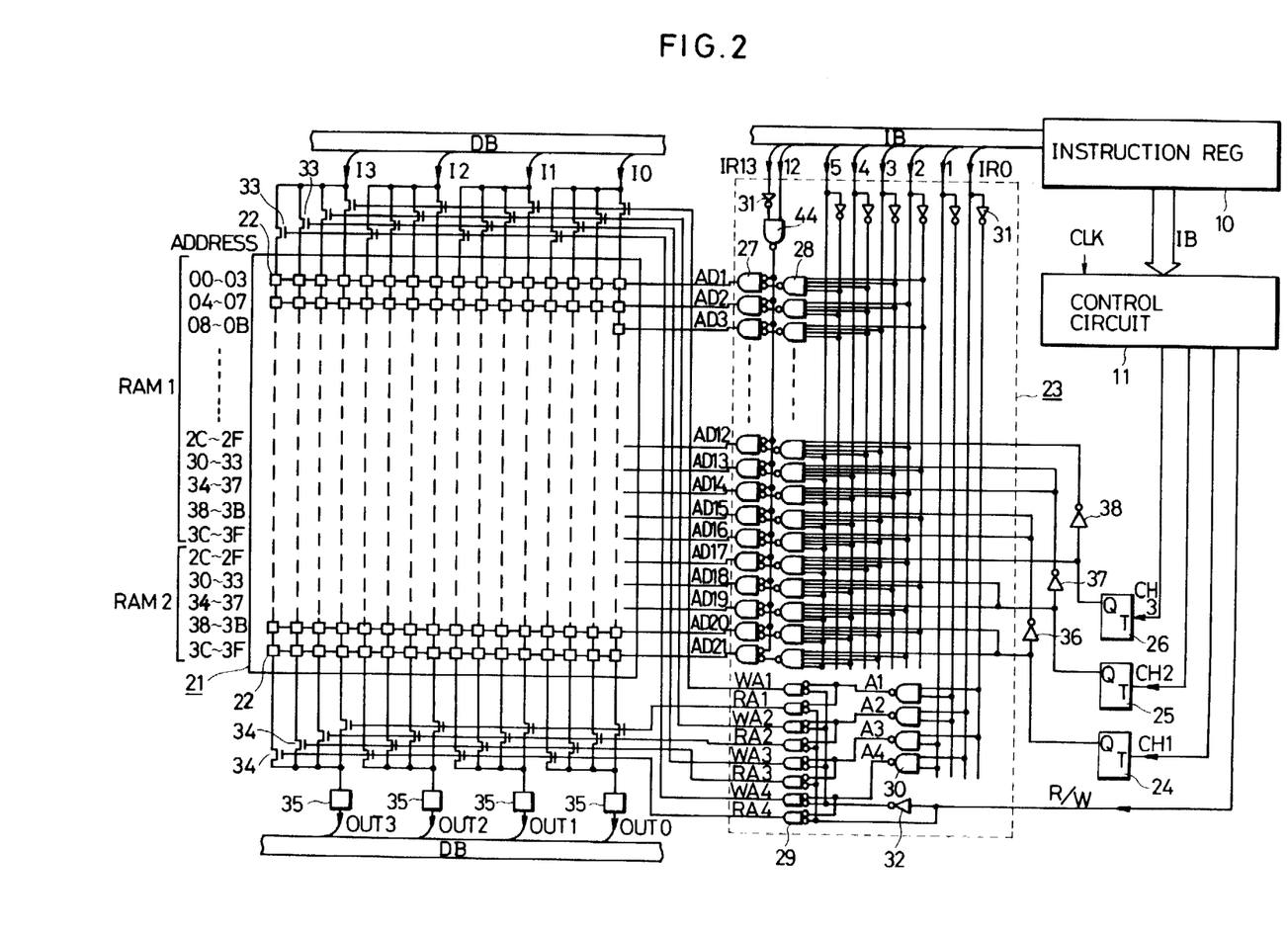
FIG. 2 is a block diagram showing in detail one embodiment of the present invention.

FIG. 2 is a block diagram showing in detail one embodiment of the present invention. The embodiment shown comprises an improvement in an addressing scheme of the random access memory in the microcomputer employed in the FIG. 1 electronic timepiece. The FIG. 2 embodiment comprises an instruction register 10, a control circuit 11, a random access memory 21, gates 33 and 34, a random access memory buffer 35, an address decoder 23, T type flip-flops 24, 25 and 26, and inverters 36, 37 and 38.

The random access memory 21 has the capacity of 4 bits $\times$ 84 and comprises a first storing portion RAM1 and a second storing portion RAM2. The random access memory 21 comprises memory cells arranged in sixteen rows and twenty-one columns, wherein every four out of the sixteen rows is addressed as one set. The input and output of each of the memory cells 22 are coupled to the column input and output lines and the input control gates 33 and the output control gates 34 are coupled to both ends of each column line. One end of each of the gates 33 is connected for each bit and each is connected to the bit corresponding to the data bus DB. One end of each of the gates 34 is also connected for each bit and is connected through the random access memory buffer 35 to the bit corresponding to the data bus DB.

The gates 33 are connected to receive the input data I0 to I3 from the data bus DB. The gates 33 are controlled with the address signals WA1 to WA4 to be described and, when any one of the address signals WA1 to WA4 is obtained from the address decoder 23, the gate 33 supplied with the said address signal is enabled, whereby one of the four column addresses is selected and the memory cell 22 of the corresponding address is supplied with the input data I0 to I3. The gates 34 are controlled with the address signals RA1 to RA4 to be described subsequently and, when any one of the address signals RA1 to RA4 is obtained from the address decoder 23, the gate 34 supplied with the said address signal is enabled, whereby one of the four column addresses is selected and the data is obtained from the memory cell of the corresponding address. The random access memory buffer 35 stores the data obtained from the memory cell and provides the output data OUT0 to OUT3 to the data bus DB.

The address decoder 23 comprises a plurality of NOR gates 27, NAND gates 28, NOR gates 29, NAND gates 30, inverters 31 and 32, and a NAND gate 44. The address decoder 23 is also connected to the two more significant bits and the six less significant bits of the instruction bus IB connected to the instruction register 10. Of these six less significant bits, the two less significant bits are each directly or through the inverter 31 for inversion of the polarity to the input of the NAND gate 30. The remaining four bits of the six less significant bits are each coupled directly or through the inverter 31 to the input of the NAND gate 28. The two more significant bits are connected directly or through the inverter 31 to the input of the NAND gate 44. Two out of a plurality of the NAND gates 28 constitute a pair, which is connected to receive the same instruction data directly or through the inverter 31 from the instruction bus IB. The output of the NAND gate 28 is connected to one of the inputs of the NOR gate 27 and the other of the inputs of the NOR gate 27 is connected to receive the output of the NAND gate 44. The output of the NOR gate 27 is connected to the sixteen memory cells 22 in rows. The output of the NOR gate 27 provides the address signals AD1 to AD21 to be described subsequently. The output of the NAND gate 30 is connected to the input of the NOR gate 29 and the output of the NOR gate 29 is connected to the gate 33 or 34. The input of the NAND gate 28 for providing the address signals AD12 to AD21 is connected through the T type flip-flops 24, 25 and 26 or through the inverters 36, 37 and 38 and the T type flip-flops 24, 25 and 28, to the control circuit 11.

The control circuit 11 is connected through the instruction bus IB to the instruction register 10. The control circuit 11 is also supplied with the clock signal CLK from the the clock generator 2 shown in FIG. 1.

The address decoder 23 is supplied with the instruction data IR0 to IR5 and IR12 and IR13 from the instruction bus IB. The instruction data IR12 and IR13 assumes "1" and "0" and the output of the NAND gate 44 is "0" in the case other than execution of an instruction for writing and reading of the data of the random access memory 21. The address signals AD1 to AD21 are provided as a function of the instruction data IR2 to IR5 selectively applied to the NAND gate 28 and the inverted signals thereof. For example, in the case where the instruction data IR2 to IR5 is all "0", only the address signal AD1 assumes "1" and in the case where only the instruction data IR2 is "1", only the address signal AD2 assumes "1". These address signals AD1 to AD21 are applied to the sixteen memory cells arranged in rows, thereby to control withdrawal of the data stored in the memory cells 22 or storage of the new data therein. In such a case, four addresses are designated by the respective address signals AD1 to AD21. For example, the addresses 00 to 03 are designated by the address signal AD1. On the other hand, the instruction data IR0 and IR1 and the inversion signals thereof are selectively applied to the NAND gate 30. In the case where the number (the hexadecimal number) represented by the instruction data IR0 and IR1 is zero, then the signal A1 out of the signals obtained from the NAND gate 30 becomes "0"; in the case where the said number is one, then the signal A2 becomes "0"; in the case where the said number is two, then the signal A3 becomes "0", and in the case where the said number is three, then the signal A4 becomes "0". These signals A1 to A4 are applied to the NOR gate 29 and are switched by the read/write control signal R/W for control of the write or read operation being applied to the NOR gate 29 from the control circuit 11 and the inverted signals thereof, whereupon the outputs are obtained from the NOR gate 29 as the address signals WA1 to WA4 or RA1 to RA4. More specifically, in the case where the read/write control signal R/W is "0", the system is placed in a state capable of providing the address signals RA1 to RA4, whereas in the case where the read/write control signal R/W is "1" the system is placed in a state capable of providing the address signals WA1 to WA4. For example, in the case where the data stored in the address 00 (16-nary number) of the random access memory 21 is to be transferred to the data bus DB, the instruction data IR0 to IR5 becomes 00 in terms of the 16-nary number, whereby the read/write control signal R/W becomes "0". Accordingly, the address signals AD1 and RA1 become "1", whereby the data of the memory cell 22 at the intersection of the input/output line connected to the gate 34 enabled by the address signal RA1 and the address signal AD1 is stored in the random access memory buffer 35, whereupon the data is transferred to the data bus DB.

On the other hand, as described previously, the capacity of the random access memory 21 is four bits × 84 and the inherent address number is 84; however, the number of the addresses designated by the six bits of the instruction data IR0 to IR5 is merely 64 and it is the capacity of only the first storing portion RAM1. Although the capacity of the second storing portion RAM2 is 20, the addresses thereof are partially the same as those of the first storing portion RAM1. More specifically, the instruction data for providing the address signals AD12 to AD16 and the instruction data for providing the address signals AD17 to AD21 are of the same instruction data. More specifically, the instruction data for providing the address signal AD12 and the instruction data for providing the address signal AD17 are the same and likewise the data for providing the address signal AD13 and that for the address signal AD18 are the same, the data for the address signal AD14 and that for the address signal AD19 are the same, the data for providing the address signal AD15 and that for the address signal AD20 are the same, and the data for providing the address signal AD16 and that for the address signal AD21 are the same. Which of the first and second storing portions RAM1 and RAM2 is to be selected is determined by the change signals CH1 to CH3 obtained from the control circuit 11.

The control circuit 11 provides the change signals CH1 to CH3 of "0" or "1" by executing the RAM CHANGE instruction obtained from the instruction bus IB. The change signal CH1 is applied to the terminal T of the T type flip-flop 24, the output from the terminal Q of the T type flip-flop 24 is applied to the NAND gates 28 for providing the address signals AD20 and AD21, and the inversion signal obtained through the inverter 36 is applied to the NAND gates 28 for providing the address signals AD15 and AD16. Likewise, the change signal CH2 is applied to the terminal T of the T type flip-flop 25 and the output from the terminal Q of the T type flip-flop 25 is applied to the NAND gates 28 for providing the address signals AD18 and AD19, and the inversion signal obtained through the inverter 37 is applied to the NAND gates 28 for providing the address signals AD13 and AD14. The change signal CH3 is applied to the terminal T of the T type flip-flop 26 and the output from the terminal Q of the T type flip-flop 26 is applied to the NAND gate 28 for providing the address signal AD17 and the inversion signal obtained through the inverter 38 is applied to the NAND gate 28 for providing the address signal AD12.

For example, in the case where the T type flip-flops 24, 25 and 26 are in a reset state, the output from the terminal Q of each of them is "0" and the output from each of the inverters 36, 37 and 38 is "1" and, therefore, the outputs of the address signals AD12 to AD16 are enabled and the first storing portion RAM1 is selected. Now assuming that the T type flip-flops 24, 25 and 26 are in a set state, then the output of the terminal Q of each of them is "1" and, therefore, the output of each of the address signals AD17 to AD21 is enabled, whereby the second storing portion RAM 2 is selected. The inversion of each of the T type flip-flops 24, 25 and 26 can be independently done by reversing the change signals CH1, CH2 and CH3 obtained from the control circuit 11. Accordingly, the first storing portion RAM1 or the second storing portion RAM2 can be selected for each of the addresses 2C to 2F, 30 to 37 and 38 to 3F in the random access memory 21 by the change signals CH1 to CH3.

Meanwhile, the FIG. 2 embodiment was depicted as an example in which the random access memory 21 is addressed by the instruction data applied to the instruction bus IB from the instruction register 10; however, alternatively random access memory 21 may also be addressed by data applied to the instruction bus IB from a register, not shown.

Figure 3:
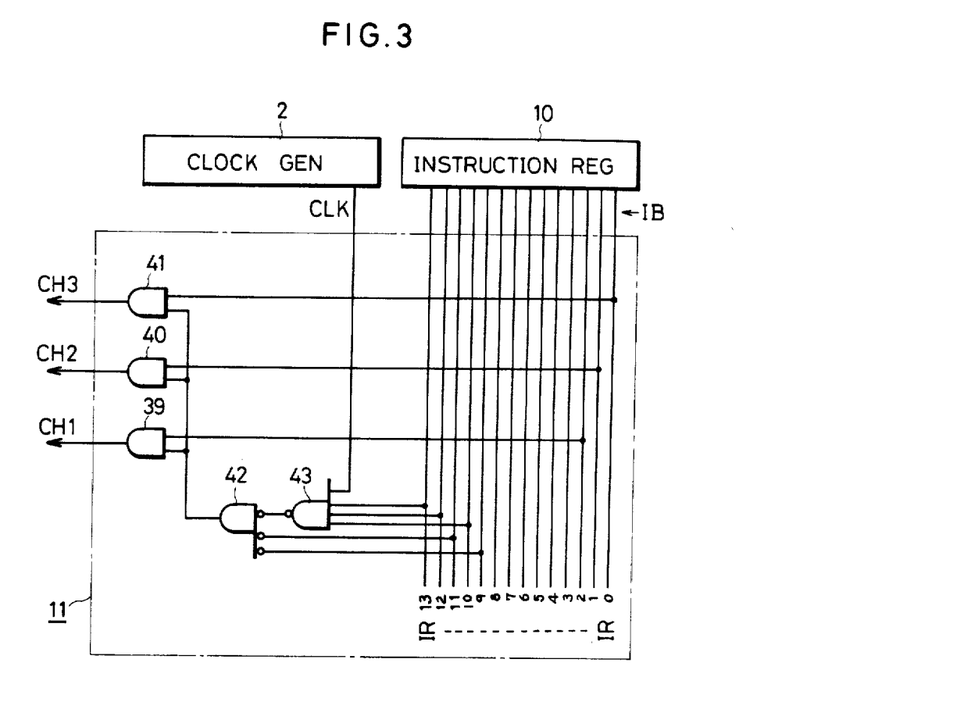
FIG. 3 is a block diagram showing in detail a portion of the control circuit.

FIG. 3 is a schematic diagram of a portion of the control circuit. The control circuit 11 comprises AND gates 39, 40 and 41, NOR gate 42 and NAND gate 43. The input of the NAND gate 43 is connected to receive the instruction data IR10, IR12 and IR13 and the clock signal CLK obtained from the clock generator 2. The input of the NOR gate 42 is connected to receive the instruction data IR9 and IR11 and the signal from the NAND gate 43. The input of one of each of the AND gates 39, 40 and 41 is connected to receive the signal from the NOR gate 42. The other input of the AND gate 39 is connected to receive the instruction data IR2, the other input of the AND gate 40 is connected to receive the instruction data IR1, and the other input of the AND gate 41 is connected to receive the instruction data IR0. The outputs of the AND gates 39, 40 and 41 provide the change signals CH1, CH2 and CH3, respectively. If the code of the RAM CHANGE instruction obtained from the instruction register 10 is the code (1) shown in TABLE I, the change signal CH1 becomes "1"; if the said code is the code (2) in TABLE I, the change signal CH2 becomes "1"; and if the said code is the code (3) in TABLE I, the change signal CH3 becomes "1", at the timing of the clock signal CLK. Meanwhile, on the occassion of execution of the RAM CHANGE instruction the instruction data IR12 and IR13 are both "1" and the output from the NAND gate 28 is "1". Accordingly, any of the address signals AD1 to AD21 are not obtained on that occasion. As a result the address decoder 23 is prevented from malfunctioning.

TABLE I

| Instruction Data IR | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| code (1) | 1 | 1 | 0 | 1 | 0 | 0 | 0 | 0 | 0 | 0 | 0 | 1 | 0 | 0 |
| code (2) | 1 | 1 | 0 | 1 | 0 | 0 | 0 | 0 | 0 | 0 | 0 | 0 | 1 | 0 |
| code (3) | 1 | 1 | 0 | 1 | 0 | 0 | 0 | 0 | 0 | 0 | 0 | 0 | 0 | 1 |

Now a description will be made of the case where the microcomputer shown in FIG. 2 is employed in a microcomputer type electronic timepiece having a multialarm function. For simplicity of description, a case where two kinds of alarm timings are set will be described.

The hour and minute data of the current time is stored for the respective digits as the addresses 34 to 37 of the first storing portion RAM1 selected by the T type flip-flop 25. On the other hand, the first alarm timing data out of the two kinds of alarm timings is stored for the respective digits in the addresses 2C to 2F of the first storing portion RAM1 selected by the T type flip-flop 26 and the second alarm timing data out of the two kinds of alarm timings is stored for the respective digits in the addresses 2C to 2F of the second storing portion RAM2 selected by the T type flip-flop 26.

The alarm processing program is executed after the carry over processing over to the minute digit of the current time is executed. In the case of the carry over processing over to the minute digit, the T type flip-flop 25 remains reset, so that the first storing portion RAM1 is selected. If and when an addition instruction code including a code for addressing the address 37 is executed in such situation, the address signal AD14 is obtained and the signal A1 becomes "0". The read/write control signal R/W first becomes "0" in the course of execution of the said instruction and the minute data of the current time stored in the address 37 of the first storing portion RAM by the address signal RA1 is applied from the random access memory buffer 35 through the data bus DB to the arithmetic logic unit 12 (see FIG. 1), where addition of unity is made. The sum obtained by the addition is loaded in the address 37 of the first storing portion RAM1, since the read/write control signal R/W becomes then "1" and the address signal WA1 becomes "1". If there occurs a carry over to the ten-minute digit of the current time, likewise addition processing is made to the ten-minute digit data stored in the address 36 of the first storing portion RAM1. The same operations are made with respect to the hour digit and the ten-hour digit.

Figure 4:
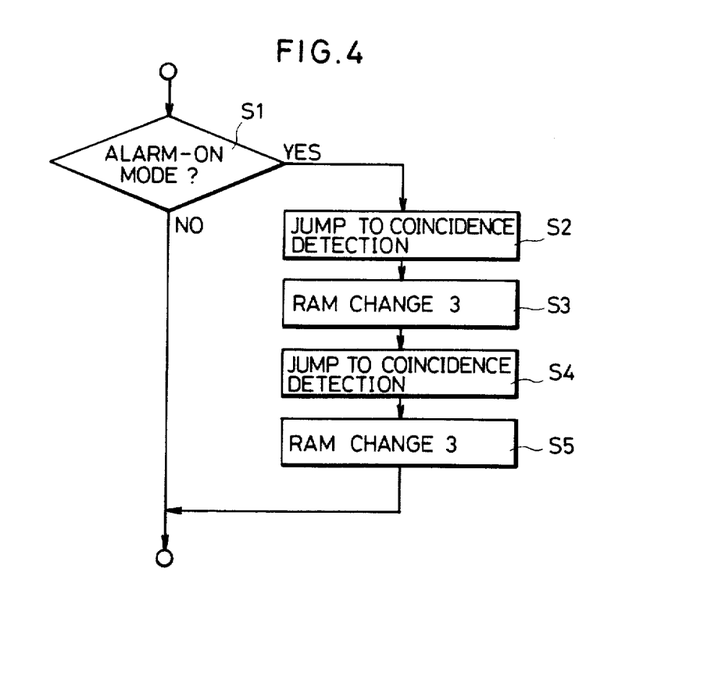
FIG. 4 is a flow chart of an alarm processing program.

The new current time data after such addition processing is then compared with the alarm time data in accordance with the alarm processing program. FIG. 4 is a flow chart showing the alarm processing program. The embodiment shown is adapted to use a predetermined bit of a predetermined address, say address number 19, out of the addresses 00 to 2B of the first storing portion RAM1 as a flag indicating that an alarm is to be raised and to that end the alarm processing program is adapted to designate first the address number 19 and then to determine the predetermined bit thereof, i.e. to determine whether it is an alarm-on mode (step S1). If an alarm is not to be raised, then the program proceeds to the following step without making alarm coincidence detection. On the other hand, if an alarm is to be raised, the program jumps to a coincidence detection program (step S2).

Figure 5:
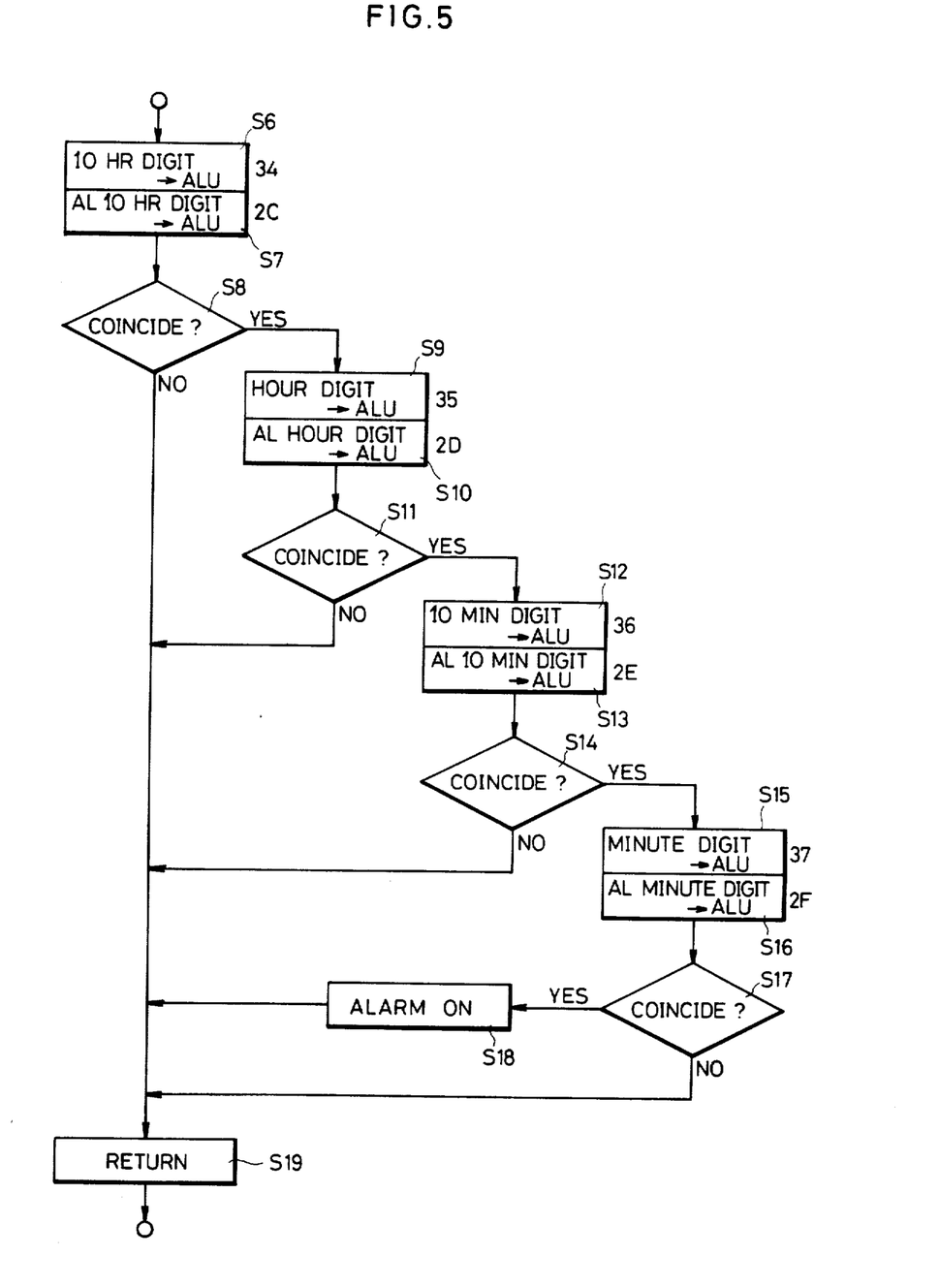
FIG. 5 is a flow chart of a coincidence detection program.

FIG. 5 is a flow chart showing a coincidence detection program. According to the coincidence detection program, first a transfer instruction for designating the address 34 storing the ten-hour digit data of the current time is executed. In such case, both the T type flip-flops 25 and 26 are in a reset state and the addresses 2C to 2F and 30 to 37 of the first storing portion RAM1 are selected. Then the read/write control signal R/W becomes "0" through execution of the transfer instruction designating the address 34 and therefore the address signals AD14 and RA1 are obtained and as a result the ten-hour digit data of the current time stored in the address 34 of the first storing portion RAM1 is sent from the random access memory buffer 35 through the data bus DB to the arithmetic logic unit 12 (see FIG. 1)(step S6). When the transfer instruction designating the address 2C is executed, the address signals AD12 and RA1 are obtained and as a result the ten-hour digit data of the first alarm timing stored in the address 2C of the first storing portion RAM1 is transferred to the arithmetic logic unit 12 (step S7). Then it is determined by the arithmetic logic unit 12 whether the ten-hour digit data of the current time and the ten-hour digit data of the alarm timing coincide with each other (step S8). In the case of non-coincidence, the program returns to the alarm processing program (step S19). In the case of coincidence, this time the transfer instruction for designating the address 35 and the transfer instruction for designating the address 2D are executed and the hour digit data of the current time and the hour digit data of the alarm timing stored in the addresses 35 and 2D, respectively, of the first storing portion RAM1 are transferred to the arithmetic logic unit 12, where comparison thereof is made (steps S9 to S11). In the case of coincidence, likewise the ten-minute digit data stored in the addresses 36 and 2E is transferred and compared (steps S12 to S14). In the case of coincidence, furthermore likewise the minute digit data stored in the addresses 37 and 2F is transferred and compared (steps S15 to S17). When coincidence is detected of up to the minute digit data, an alarm signal is obtained in accordance with the alarm raising instruction (step S18) and then the program returns to the alarm processing program (step S19).

Returning to FIG. 4, if the program returns to the alarm processing program, then the RAM CHANGE 3 instruction is executed and as a result the change signal CH3 becomes "1" and the T type flip-flop 26 is set. Accordingly, the second storing portion RAM2 is selected as for the addresses 2C to 2F (step S3). In such a state the program again jumps to the coincidence detection program (step S4).

Referring to FIG. 5, the coincidence detection program is executed in the same manner as described previously. In such case, when the transfer instruction of the data of the ten-hour digit, the hour digit, the ten-minute digit and the minute digit of the alarm timing is executed, the address signal AD17 is obtained and the second alarm timing data stored in the addresses 2C to 2F of the second storing portion RAM2 is transferred. On the other hand, since the T type flip-flop 25 remains reset, the transfer instruction of the current time data designating the addresses 34 to 37 is executed and the address signal AD14 is obtained. Accordingly, the addresses 34 to 37 of the first storing portion RAM1 is designated in the same manner as described previously.

When the coincidence detection program is completed and the program returns to the alarm processing program, referring to FIG. 4, the RAM CHANGE 3 instruction is again executed and the change signal CH3 becomes "1" and the T type flip-flop 26 is reversed of the storing state to be in a reset state, whereby the first storing portion RAM1 is selected (step S5).

As described in the foregoing, by setting or resetting the T type flip-flops 24, 25 and 26 in accordance with the RAM CHANGE instruction, either the first storing portion RAM1 or the second storing portion RAM2 designated by the same address can be selected. Accordingly, in the case where different data (such as a plurality of pieces of alarm timing data) is to be subjected to the same processing (such as detection of coincidence with the current time), the different data is stored in the first storing portion RAM1 and the second storing portion RAM2 designated by the same address and after the RAM CHANGE instruction is executed, the program jumps to the subroutine to execute the same processing, with the result that the program can be simplified.

Meanwhile, although the inventive microcomputer was described as employed in multialarm processing of an electronic timepiece, this should not be construed by way of limitation inasmuch as the present invention can be employed in any other applications in which different data is to be subjected to the same processing. For example, the present invention could be utilized in addition processing of dual time of an electronic timepiece. More specifically, by storing the current time data of Tokyo in the first storing portion RAM1 and the current time data of New York in the second storing portion RAM2, the present invention can be employed in the same addition processing of both of them for each second.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory addressing system for a microcomputer, comprising:
  instruction data generating means for generating instruction data for designating operations of said microcomputer, including;
  read only memory means having outputs for storing a program, and
  instruction register means coupled to said read only memory means outputs for storing instruction data obtained from said read only memory means and providing said instruction data, said instruction data having a plurality of bits;
  control means coupled to said instruction data generating means for executing said operations designated by said instruction data;
  said control means comprising change signal generating means said change signal generating means including;
  detecting gate means having an output, said detecting gate means being coupled to said instruction register means and responsive to said plurality of bits of said instruction data for providing a signal indicative thereof at said detecting gate means output when predetermined instruction data is received from said instruction data generating means;
  logical state storing means coupled to said change signal generating means for storing a first logical state or a second logical state when said change signal is generated;
  storage means having a multiplicity of one-bit memory cells connected to address signals for designating addresses, wherein a plurality of memory cells out of said multiplicity of memory cells are designated as one set by one of said address signals; and
  address decoder means coupled to said instruction data generating means and said storage means for receiving address data included in said instruction data for instructing reading or writing of the data from or to said storage means and for providing said address signal to said storage means;
  said address decoder means including logic means for generating a plurality of said address signals for one of said address data for selectively providing one of said plurality of address signals in accordance with the output from said logical state storing means and said logic means comprises a pair of logic gate means controlled responsive to the output signal from said logical state storing means, whereby one of said logic gate means is enabled to provide said address signal, wherein:

said logical state storing means comprises flip-flop means, having an output, for storing said first logical state or said second logical state; and inverter means, having an output, said inverter means being coupled to said output of said flip-flop means for inverting the polarity of a signal received therefrom and for providing said inverted signal at said output;

said output of said flip-flop means being coupled to one of said pair of logic gate means of said address decoder means and said output of said inverter being coupled to the other logic gate means.

2. A memory addressing system for a microcomputer, comprising:

instruction data generating means for generating instruction data for designating operations of said microcomputer, including;

read only memory means having outputs for storing a program, and instruction register means coupled to said read only memory means outputs for storing instruction data obtained from said read only memory means and providing said instruction data, said instruction data having a plurality of bits;

control means coupled to said instruction data generating means for executing said operations designated by said instruction data;

said control means comprising change signal generating means said change signal generating means including;

detecting gate means having an output, said detecting gate means being coupled to said instruction register means and responsive to said plurality of bits of said instruction data for providing a signal indicative thereof at said detecting gate means output when predetermined instruction data is received from said instruction data generating means; and a plurality of logic gate means having said output of said detecting gate means coupled thereto and one bit of said instruction data coupled thereto, the outputs of said plurality of logic gate means constituting a plurality of change signals;

logical state storing means coupled to said change signal generating means for storing a first logical state or a second logical state when said change signal is generated comprising a plurality of flip-flops having an output for receiving said plurality of change signals, and a plurality of said inverters coupled to the outputs of said flip-flops;

storage means having a multiplicity of one-bit memory cells connected to address signals for designating addresses, wherein a plurality of memory cells out of said multiplicity of memory cells are designated as one set by one of said address signals; and address decoder means coupled to said instruction data generating means and said storage means for receiving address data included in said instruction data for instructing reading or writing of the data from or to said storage means and for providing said address signal to said storage means;

said address decoder means comprising logic gate means coupled to said output of said flip-flops and logic means for generating a plurality of said address signals for one of said address data for selectively providing one of said plurality of address signals in accordance with the output from said logical state storing means and said logic means comprises a plurality of pairs of logic gate means coupled to receive output signals from said inverters and controlled responsive to the output signal from said logical state storing means, whereby one of said logic gate means is enabled to provide said address signal.

3. An electronic timepiece employing a microcomputer, comprising:

clock generator means for generating various clock signals;

instruction data generating means for generating instruction data having a plurality of bits for designating various operations said instruction data generating means including:

read only memory means having outputs for fixedly storing a program, said program being readable from said outputs and instruction register means coupled to said outputs of said read only memory means, for storing instruction data obtained from said read only memory means and for providing said instruction data having a plurality of bits;

instruction bus means coupled to the outputs of said instruction data generating means for transferring said instruction data;

control means coupled to said instruction bus means for executing said operations designated by said instruction data from said instruction data generating means;

said control means comprising change signal generating means having detecting gate means coupled to said instruction bus means and responsive to a plurality of bits of said instruction data for detecting predetermined instruction data;

logical state storing means coupled to said change signal generating means for storing a first logical state or a second logical state when said change signal is generated, comprising flip-flop means, having an output, for storing said first logical state or said second logical state; and inverter means, having an output, said inverter means being coupled to said output of said flip-flop means for inverting the polarity of a signal from said flip-flop means;

storage means having a multiplicity of one-bit memory cells connected to address signals for designating addresses, wherein a plurality of memory cells out of said multiplicity of memory cells are designated as one set by one of said address signals;

data bus means coupled to the inputs and outputs of said storage means for transferring data to and from said storage means;

address decoder means coupled to said instruction bus means and said storage means for receiving address data included in the instruction data for instructing reading or writing of the data from or in said storage means and for providing said address signal to said storage means;

said address decoder means including logic means for generating a plurality of said address signals for one said address data for selectively providing one of said plurality of address signals in accordance with the output from said logical state storing means and said logic means comprises a pair of logic gate means controlled in response to the output signal from said logical state storing means, whereby one of said pair of logic gate means is enabled to provide said address signal;

said output of said flip-flop means being coupled to one of said pair of logic gate means of said address decoder and said output of said inverter being coupled to the other logic gate means.

arithmetic logic means coupled to said data bus means for performing an arithmetic operation on the data from said data bus means and for providing the result thereof to said data bus means; and display means coupled to said data bus means for displaying the data obtained from said data bus.

4. An electronic timepiece employing a microcomputer, comprising:

clock generator means for generating various clock signals;

instruction data generating means for generating instruction data having a plurality of bits for designating various operations said instruction data generating means including:

read only memory means having outputs for fixedly storing a program, said program being readable from said outputs and instruction register means coupled to said outputs of said read only memory means, for storing instruction data obtained from said read only memory means and for providing said instruction data having a plurality of bits;

instruction bus means coupled to the outputs of said instruction data generating means for transferring said instruction data;

control means coupled to said instruction bus means for executing said operations designated by said instruction data from said instruction data generating means;

said control means comprising change signal generating means, comprising detecting gate means coupled to said instruction bus means and responsive to a plurality of bits of said instruction data for detecting predetermined instruction data; and a plurality of logic gate means having the output of said detecting gate means coupled thereto and one-bit of said instruction bus coupled thereto, the outputs of said plurality of logic gate means constituting a plurality of change signals;

logical state storing means coupled to said change signal generating means for storing a first logical state or a second logical state when said change signal is generated, comprising a plurality of said flip-flops receiving said plurality of change signals, and a plurality of said inverters coupled to the outputs of said flip-flops;

storage means having a multiplicity of one-bit memory cells connected to address signals for designating addresses, wherein a plurality of memory cells out of said multiplicity of memory cells are designated as one set by one of said address signals;

data bus means coupled to the inputs and outputs of said storage means for transferring data to and from said storage means;

address decoder means coupled to said instruction bus means and said storage means for receiving address data included in the instruction data for instructing reading or writing of the data from or in said storage means and for providing said address signal to said storage means;

said decoder means including:

logic means for generating a plurality of said address signals for one said address for selectively providing one of said plurality of address signals in accordance with the output from said logical state storing means and said logic means comprises a pair of logic gate means controlled in response to the output signal from said logical state storing means, whereby one of said pair of logic gate means is enabled to provide said address signal;

said logical gate means being coupled to said outputs of said flip-flops, and a plurality of pairs of said logic gate means receiving the outputs of said inverters;

arithmetic logic means coupled to said data bus means for performing an arithmetic operation on the data from said data bus means and for providing the result thereof to said data bus means; and display means coupled to said data bus means for displaying the data obtained from said data bus.

* * * * *